United States Patent
Hellman et al.

(10) Patent No.: US 11,378,125 B2
(45) Date of Patent: Jul. 5, 2022

(54) VALVE AND A MANUFACTURING METHOD OF A BEARING SURFACE FOR A VALVE

(71) Applicant: NELES FINLAND OY, Vantaa (FI)

(72) Inventors: Jussi Hellman, Vantaa (FI); Kari Vierimaa, Vantaa (FI)

(73) Assignee: NELES FINLAND OY, Vantaa (FI)

( * ) Notice: Subject to any disclaimer, the term of this patent is extended or adjusted under 35 U.S.C. 154(b) by 0 days.

(21) Appl. No.: 17/049,277

(22) PCT Filed: Apr. 20, 2018

(86) PCT No.: PCT/FI2018/050284
§ 371 (c)(1),
(2) Date: Oct. 20, 2020

(87) PCT Pub. No.: WO2019/202200
PCT Pub. Date: Oct. 24, 2019

(65) Prior Publication Data
US 2021/0246947 A1    Aug. 12, 2021

(51) Int. Cl.
*F16K 1/22* (2006.01)
*F16C 33/10* (2006.01)
(Continued)

(52) U.S. Cl.
CPC .......... *F16C 33/1095* (2013.01); *F16C 33/14* (2013.01); *F16K 1/224* (2013.01);
(Continued)

(58) Field of Classification Search
CPC .... F16C 33/1095; F16C 33/14; F16C 33/125; F16C 33/128; F16C 2223/80;
(Continued)

(56) References Cited

U.S. PATENT DOCUMENTS 4,318,422 A * 3/1982 Nakanishi ............. F16K 1/2265
137/246
4,589,628 A * 5/1986 Barker ................ F16K 27/0218
251/214

(Continued)

FOREIGN PATENT DOCUMENTS

CN         206668755 U     11/2017
DE    10 2009 037262 A1     2/2011
(Continued)

OTHER PUBLICATIONS

May 11, 2021 Office Action issued in Chinese Patent Application No. 201890001618.1.
(Continued)

*Primary Examiner* — John Bastianelli
(74) *Attorney, Agent, or Firm* — Oliff PLC

(57) ABSTRACT

A valve and a bearing surface for a valve and a manufacturing method of the same including a valve body with a main channel extending between a fluid inlet and a fluid outlet, and a closing member provided in the main channel. The valve further includes a shaft connected to the closing member for moving the closing member between an open and a closed position. Moreover, the valve includes at least one bearing surface between the valve body and the closing member or the valve body and the shaft, the bearing surface further including a plurality of cavities filled with solid lubricant.

13 Claims, 5 Drawing Sheets

(51) Int. Cl.
*F16C 33/14* (2006.01)
*F16K 5/22* (2006.01)
*F16K 25/00* (2006.01)
*B33Y 80/00* (2015.01)
*F16C 33/12* (2006.01)

(52) U.S. Cl.
CPC .............. *F16K 5/22* (2013.01); *F16K 5/227* (2013.01); *F16K 25/00* (2013.01); *B33Y 80/00* (2014.12); *F16C 33/125* (2013.01); *F16C 33/128* (2013.01); *F16C 2223/80* (2013.01); *F16C 2361/91* (2013.01)

(58) Field of Classification Search
CPC .... F16C 2361/91; F16C 17/04; F16C 17/045; F16C 29/02; F16C 2220/20; F16C 2223/46; F16K 1/224; F16K 25/00; F16K 5/22–227; B33Y 80/00
USPC ............ 251/355, 304–317.1; 29/898.1
See application file for complete search history.

(56) References Cited

U.S. PATENT DOCUMENTS

| | | | | |
|---|---|---|---|---|
| 6,896,411 B2 * | 5/2005 | Lee | ........................ | F16C 17/02 29/898.059 |
| 7,118,279 B2 * | 10/2006 | Fujita | ....................... | F02F 1/20 384/285 |
| 7,470,065 B2 * | 12/2008 | Stadlmayr | .............. | B21D 53/10 384/285 |
| 2011/0278489 A1 * | 11/2011 | Linser | ..................... | F16K 41/02 251/355 |
| 2016/0102781 A1 * | 4/2016 | Glaun | .................. | B23K 26/342 137/594 |
| 2017/0328406 A1 * | 11/2017 | Ito | ......................... | F16C 33/128 |

FOREIGN PATENT DOCUMENTS

| | | |
|---|---|---|
| DE | 11 2015 005771 T5 | 9/2017 |
| EP | 0 167 869 A2 | 1/1986 |
| EP | 3 015 200 A1 | 5/2016 |
| GB | 706264 A | 3/1954 |
| JP | 2010-071397 A | 4/2010 |
| RU | 2 089 760 C1 | 9/1997 |
| WO | 2007/094401 A1 | 8/2007 |
| WO | 2011/072664 A1 | 6/2011 |
| WO | 2015/050183 A1 | 4/2015 |
| WO | 2019/081082 A1 | 5/2019 |

OTHER PUBLICATIONS

Aug. 16, 2018 Search Report issued in International Patent Application No. PCT/FI2018/050284.
Jun. 12, 2020 International Preliminary Reporton Patentability issued in International Patent Application No. PCT/FI2018/050284.
Mar. 25, 2021 Extended Search Report issued in European Patent Application No. 18915171.5.

* cited by examiner

VALVE AND A MANUFACTURING METHOD OF A BEARING SURFACE FOR A VALVE

FIELD OF THE INVENTION

The present invention relates to a valve and particularly to a bearing surface for a valve and to a manufacturing method of the same.

BACKGROUND OF THE INVENTION

A low operating torque of a valve improves the usability, reliability and controllability of a valve. Traditionally valve components comprise, for example, carbide coatings, which when in contact, lead to high friction coefficients, and further to high operating torques.

A problem in a valve is that lubrication solutions commonly used in bearings are difficult to implement, because the lubricant may come into contact with the fluid flowing through the valve. Therefore, a challenge is to ensure that the lubricant remains in place at the bearing surface.

BRIEF DESCRIPTION OF THE INVENTION

An object of the present invention is thus to provide a bearing surface and a method for manufacturing the same to overcome at least some of the above problems. The objects of the invention are achieved by what is stated in at least one of the claims. The preferred embodiments of the invention are disclosed in the claims.

The invention is based on the idea of providing a valve, which comprises a valve body with a main channel extending between a fluid inlet and a fluid outlet and a closing member provided in said main channel, and a shaft connected to said closing member for moving the closing member between an open and a closed position. In addition, the valve comprises at least one bearing surface between the valve body and the closing member or the valve body and the shaft, and said bearing surface further comprises a plurality of cavities filled with solid lubricant.

An advantage of the claimed valve is that the lubricant is maintained longer on the bearing surfaces and thus lubrication periods and valve lifetime are increased.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
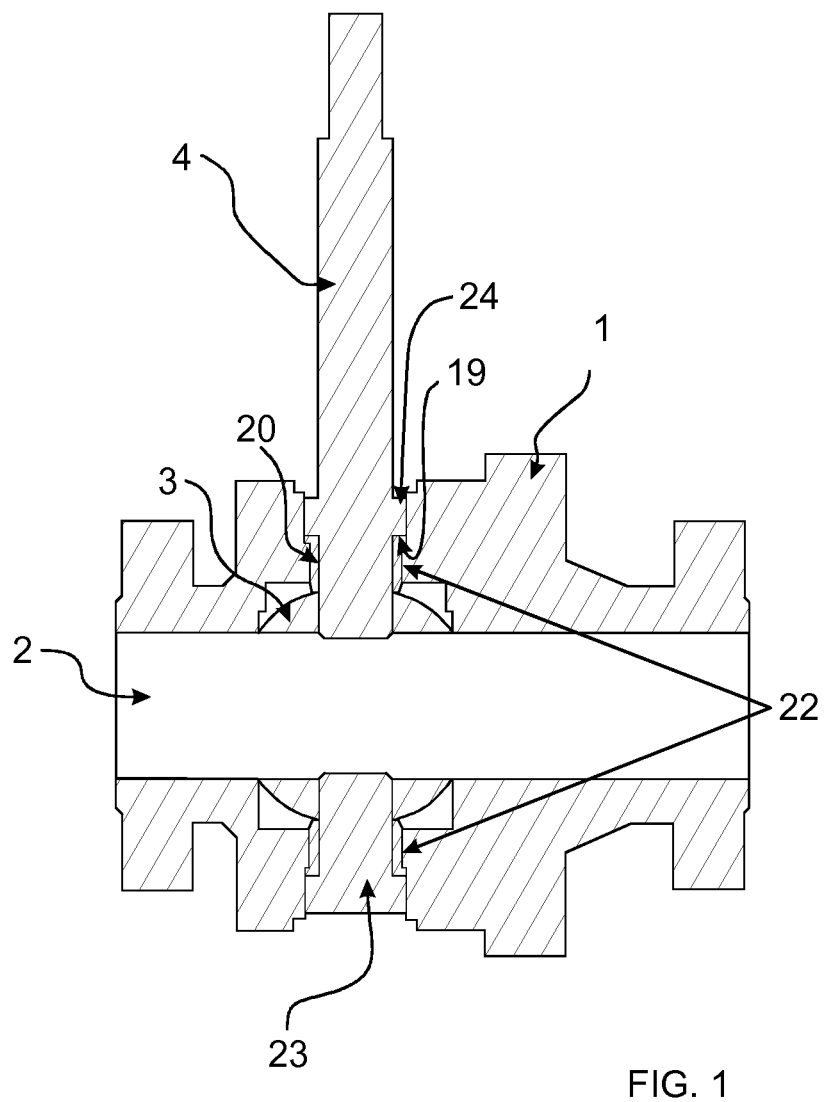
FIG. 1 illustrates an overall drawing of a valve arrangement.

FIG. 1 illustrates an overall drawing of a valve arrangement. In the example of FIG. 1, the valve is a ball valve. Alternatively, the valve may also be a butterfly valve, for instance. FIG. 1 shows a valve body 1 comprising of a main channel 2 extending between a fluid inlet and a fluid outlet and a closing member 3 provided in said main channel 2. In addition, the valve comprises a shaft 4 with a shaft shoulder 24, which shaft 4 is connected to said closing member 3 for moving the closing member 3 between an open and a closed position.

The valve further comprises at least one bearing surface and said bearing surface is in fluid connection with fluid flowing in the main channel 2. In FIG. 1, said bearing surface is provided between the valve body 1 and the shaft shoulder 24, indicated by reference number 19, or the valve body 1 and the shaft 4, indicated by reference number 20, and comprises a plurality of cavities filled with solid lubricant. The bearing surface may also be provided between the valve body 1 and the closing member 3. A solid lubricant refers to a lubricant that remains in a solid state throughout the operating temperature of the valve in question.

Figure 2A:
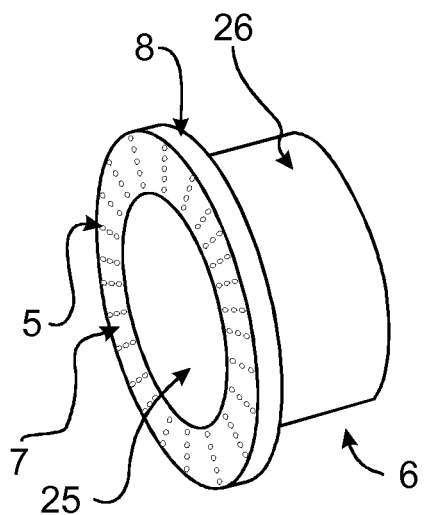
FIGS. 2a-2c are drawings illustrating a first, a second and a third embodiment of a bearing surface, respectively.

FIG. 2a illustrates a first embodiment of a bearing surface. In the embodiment of FIG. 2a, a valve bearing comprises a cylindrical sleeve 6 with an end surface 7 and the cylindrical sleeve 6 further comprises a flange 8 in the end surface 7. In the first embodiment, said bearing surface is an axial bearing surface bearing axial loads and said axial bearing surface is provided in said end surface 7. In another example, a bearing surface may be provided on the inner circumferential surface 25 or on the outer circumferential surface 26 of the cylindrical sleeve 6, or on both surfaces. In any case, the bearing surface comprises a plurality of cavities 5 that are filled with solid lubricant.

In FIG. 2a, said cylindrical sleeve 6 comprises a flange 8. Alternatively, said cylindrical sleeve 6 may be constructed without said flange 8. The length of said cylindrical sleeve 6 may also vary and the cylindrical sleeve 6 may, for instance, be shaped as a ring. In another example, the valve bearing comprises two ring-shaped cylindrical sleeves wherein both comprise axial bearing surfaces on their respective end surfaces and the said bearing surfaces are arranged to face each other.

Said cylindrical sleeve 6 may be used in two different locations of a valve, as illustrated in FIG. 1 by reference number 22. In the upper locations the shaft 4 of the valve extends through the cylindrical sleeve 6 and in the lower location a lower shaft or protrusion 23 may extend through the cylindrical sleeve 6. If the bearing surface is provided on the inner circumferential surface 25 of the cylindrical sleeve 6, the bearing surface makes contact with the shaft 4 and if the bearing surface is provided on the outer circumferential surface 26 of the cylindrical sleeve 6, the bearing surface makes contact with the valve body 1.

Figure 2B:
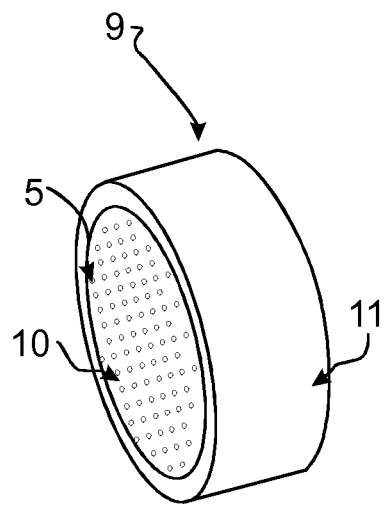

FIG. 2b illustrates a second embodiment of a bearing surface. In the second embodiment, the bearing surface is a radial bearing surface bearing radial loads. In the second embodiment, a valve bearing comprises a cylindrical sleeve 9 where the bearing surface is provided in an inner circumferential surface 10 of said cylindrical sleeve 9. Alternatively said bearing surface may be provided only on the outer circumferential surface 11 or furthermore, on both the inner 10 and the outer circumferential surface 11. Said bearing surface comprises a plurality of cavities 5 that are filled with solid lubricant. Alternatively, the cavities may be replaced with through holes.

The cylindrical sleeve 9 may be utilized in the corresponding locations as the cylindrical sleeve 6 has been illustrated in FIG. 1, for instance. If the bearing surface is provided on the inner circumferential surface 10 of the cylindrical sleeve 9, the bearing surface makes contact with the shaft 4 and if the bearing surface is provided on the outer circumferential surface 11 of the cylindrical sleeve 9, the bearing surface makes contact with the valve body 1.

Figure 2C:
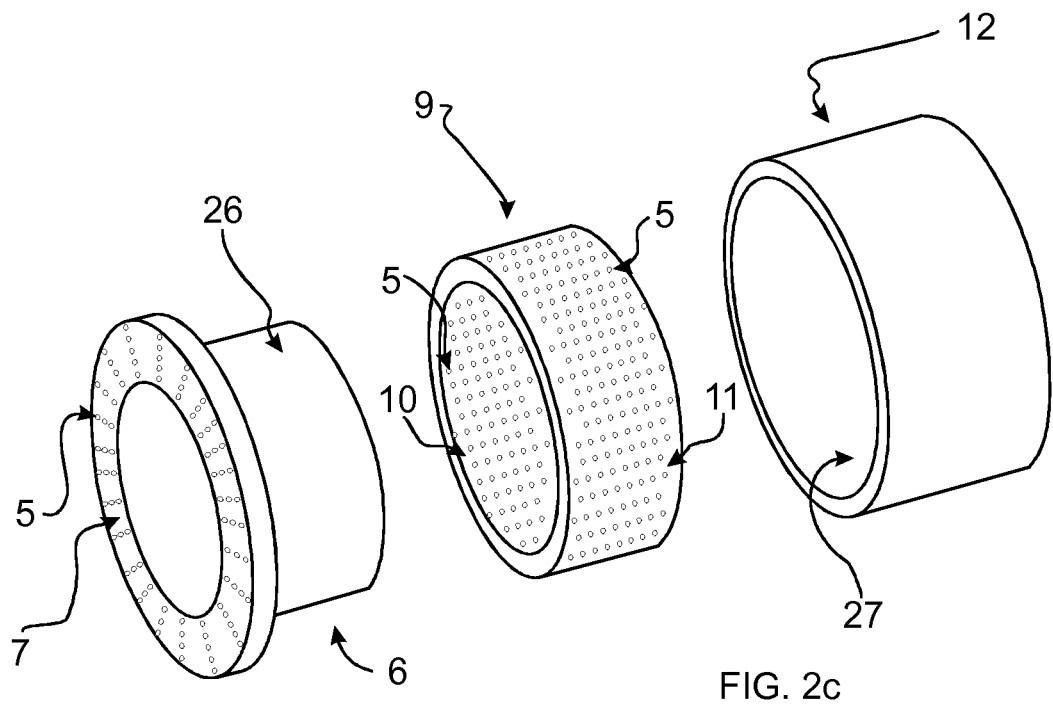

FIG. 2c illustrates a third embodiment of a bearing surface. In the third embodiment, a valve bearing comprises an inner cylindrical sleeve 6, a middle cylindrical sleeve 9, an outer cylindrical sleeve 12, and a first 7, a second 10 and a third bearing surfaces 11, wherein the first bearing surface 7 is an axial bearing surface bearing axial loads and the second 10 and the third bearing surfaces 11 are radial bearing surfaces bearing radial loads.

In this embodiment, the second 10 and the third radial bearing surfaces 11 are arranged on the inner and outer circumferential surfaces of the middle cylindrical sleeve 9, respectively. Furthermore, said middle cylindrical sleeve 9 is arranged between an outer cylindrical sleeve 12 and an inner cylindrical sleeve 6. The valve bearing illustrated in FIG. 2c may be utilized in the corresponding locations as the cylindrical sleeve 6 has been illustrated in FIG. 1, for instance.

In the third embodiment shown in FIG. 2c, the first bearing surface is provided in an end surface 7 of the inner cylindrical sleeve 6 and the second and third bearing surfaces are provided, respectively, on the inner 10 and outer 11 circumferential surfaces of the middle cylindrical sleeve 9. The first 7, second 10 and third bearing surfaces 11 comprise of a plurality of cavities 5 filled with solid lubricant.

In FIG. 2c, said cylindrical sleeve 6 comprises a flange 8. Alternatively, said cylindrical sleeve 6 may be constructed without said flange 8. The length of said cylindrical sleeve 6 may also vary and the cylindrical sleeve 6 may, for instance, be shaped as a ring.

Alternatively, the third embodiment may be constructed without the middle cylindrical sleeve. In this case, at least the outer circumferential surface 26 of the inner cylindrical sleeve 6 and/or the inner circumferential surface 27 of the outer cylindrical sleeve 12 are provided with bearing surfaces comprising a plurality of cavities 5 filled with solid lubricant. In yet another alternative, the embodiment may be constructed without the outer cylindrical sleeve 12. In yet another alternative, the embodiment may be constructed without the inner cylindrical sleeve 6.

Figure 3:
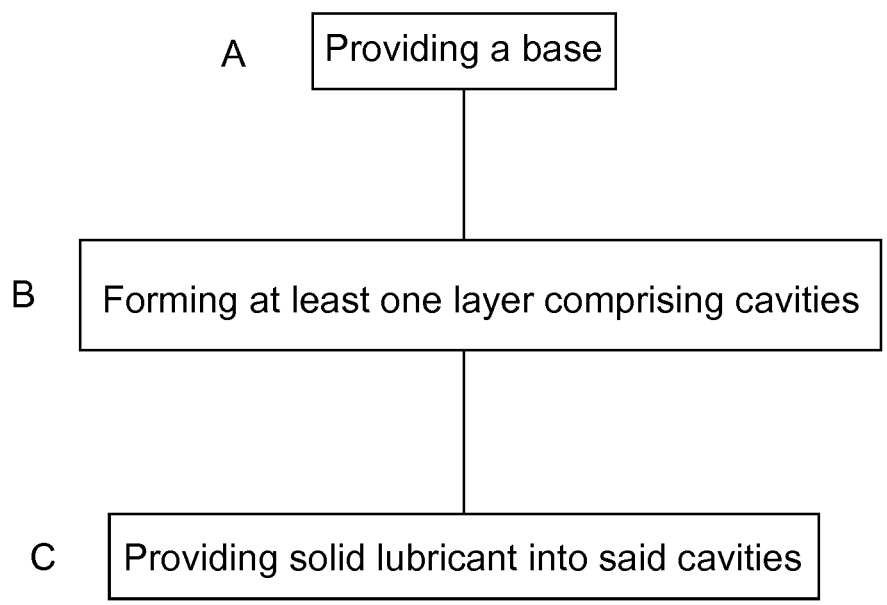
FIG. 3 is a block chart illustrating a method for manufacturing a bearing surface.

FIG. 3 is a block diagram illustrating manufacturing of a bearing surface. The block diagram of FIG. 3 may be utilized for manufacturing a bearing surface as illustrated in FIGS. 2a-2c, for instance.

In block A of FIG. 3, a base is provided. The base may be a metallic base, for instance. In block B, at least one layer comprising cavities is formed on said base. The layer may be formed using metallic powder, which powder may further comprise a Co-alloy, for instance. Furthermore, in one example, the method may comprise forming of several layers comprising cavities and the position of the cavities is changed in at least some of the different layers to provide cavities comprising counterdrafts. In this context, counterdrafts refer to features in the sidewalls of said cavities that are protruding from the sidewall towards the center of said cavity. In yet another example, said layers are formed using metallic powder.

In block C, solid lubricant is provided into said cavities. The temperature range of use for the solid lubricant is typically −200° C.-+200° C., but may be up to 600° C. and said solid lubricant may, for instance, be a mixture of lubricant and binder components. It may comprise chemical compounds, such as sulphides or fluorides. Using the manufacturing method illustrated in FIG. 3 is advantageous, as the valve bearing component and the cavities for the solid lubricant can be manufactured at the same time. In addition, formation of cavities with counterdrafts would not be possible using subtractive manufacturing methods.

Figure 4A:
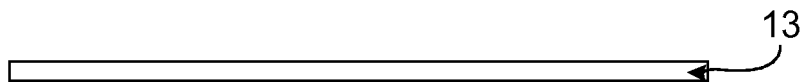
FIGS. 4a-4f are drawings illustrating a preferred embodiment of a manufacturing method of a bearing surface.
Figure 4B:
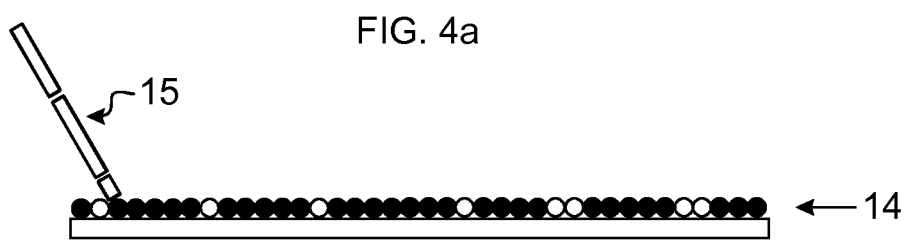

FIGS. 4a-4f illustrate an advantageous embodiment of a manufacturing method for a bearing surface. It is to be understood that the embodiment of FIGS. 4a-4f is merely an example of a possible manufacturing method for a bearing surface, which can be utilized in the embodiments of FIGS. 1 to 3, for instance. In FIG. 4a, a metallic base 13 is provided. In FIG. 4b, a layer of metallic powder 14 is spread onto the base and said layer is melt with a focused laser beam 15. The laser beam 15 melts the metallic powder 14 from the locations where it is being focused to and leaves unmelt powder elsewhere resulting in a layer with cavities 5 in predetermined locations, where the laser beam 15 has not melt said metallic powder 14. The diameter of said cavities is in the range of 1-3 mm, and preferably approximately 2.5 mm.

Figure 4C:
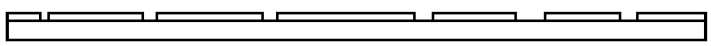
Figure 4D:
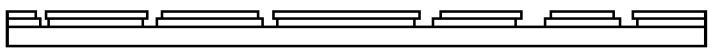
Figure 4E:
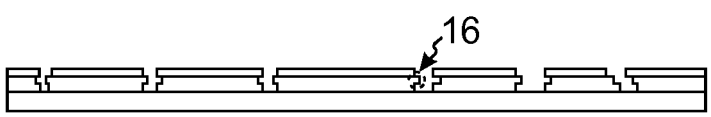
Figure 4F:
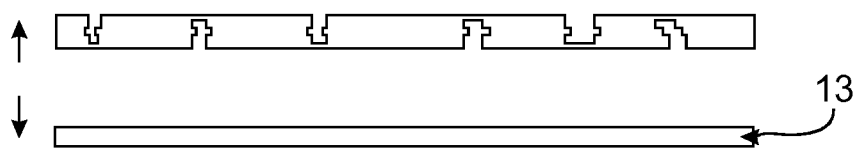

FIG. 4c illustrates a bearing surface comprising cavities after the beam has melt said metallic powder from predetermined locations. In FIG. 4d, a succeeding layer of metallic powder has been added on top of the first layer and the succeeding layer has been melt using a focused laser beam. In FIG. 4e a third layer of metallic powder has been spread and melt on top of the previous layer for forming a bearing surface comprising cavities. In FIG. 4f, the base plate is removed from the bearing surface. Alternatively, the base plate may remain attached to the bearing surface. The bearing surface is typically, but no always, post-processed. Said post-processing may comprise, for example, machining, peening, heat treating, thermochemical surface hardening or coating.

The position of said predetermined locations is changed in at least some of the different layers to provide cavities comprising counterdrafts 16. This is further illustrated in the example of FIGS. 4c-4f, where the progression of layer build-up of a bearing surface is illustrated. The displacement of layers in FIGS. 4c-4f is exaggerated and not in scale for improved illustration. In the example of FIG. 4e, the resulting counterdrafts 16 comprise one layer but a counterdraft may also comprise several layers. Alternatively, the side walls of the cavities may, for instance, be curved for creating counterdrafts.

In the example of FIGS. 4a-4f, a powder bed additive manufacturing method is described for manufacturing a bearing surface for a valve. However, other additive manufacturing methods, such as directed energy deposition (DED), may be used as well.

In additive manufacturing, different manufacturing parameters are frequently used for internal parts of an object and for external part of an object. Another alternative to implement counterdrafts into said sidewalls of said cavities is to apply manufacturing parameters commonly used for internal parts of an object, to manufacture the sidewalls of said cavities.

In this example, first, a 3D-model of a bearing surface having cavities without counterdrafts, is provided and second, using said 3D-model, a valve bearing surface is manufactured using additive manufacturing wherein parameters commonly used for internal parts of an object are used to manufacture the side walls of cavities in order to form counterdrafts on the sidewalls of said cavities. Furthermore, without departing the scope of this example, said counterdrafts may be formed using any parameters that are atypical for forming a surface in additive manufacturing. Typically, in additive manufacturing, parameters for manufacturing surfaces are chosen such that the surface of the product is smooth. In this context, atypical parameters refer to parameters that are deliberately used to manufacture a rough or uneven surface.

Using parameters commonly used for internal parts of an object increases the surface roughness, and therefore, the friction coefficient on said sidewalls of said cavities, as increased surface topography acts as counterdrafts. This promotes holding of solid lubricant in said cavities, that is, the shape of the sidewalls of the cavities promotes solid lubricant presence at the bearing surface for longer time periods.

Figure 5A:
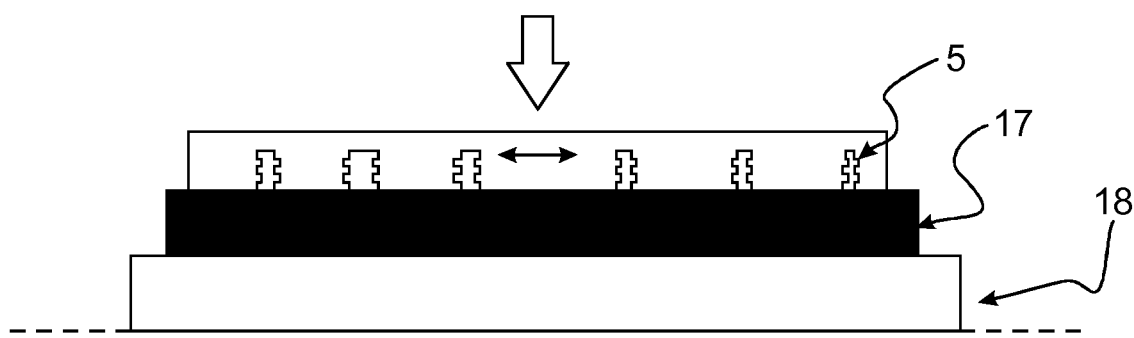
FIGS. 5a and 5b illustrate a preferred embodiment of providing solid lubricant into the cavities of the bearing surface.
Figure 5B:

FIGS. 5a and 5b illustrate, by way of example, a possible method of providing solid lubricant into the cavities of a bearing surface manufactured according to the method of FIGS. 4a to 4e, for instance. In the embodiment illustrated of FIG. 5a, a layer of solid lubricant 17 is provided against a bearing surface. This is followed by pressing the bearing surface towards said layer of solid lubricant 17 to extrude said solid lubricant into the cavities 5 of said bearing surface. The embodiment of FIG. 5a may also comprise moving the bearing surface back and forth in a direction perpendicular to the pressing direction to enhance the extrusion of solid lubricant into said cavities 5.

FIG. 5b illustrates the bearing surface after the solid lubricant has been introduced into the cavities 5 of the bearing surface comprising counterdrafts 16. Said counterdrafts 16 prevent the solid lubricant from departing said cavities therefore increasing lubrication periods. During valve operation, the bearing surface undergoes a cyclic mechanical loading which elastically deforms the bearing surface in micro-scale. Furthermore, the friction heat elevates the temperature of bearing surface and countersurface, which results in thermal expansion and deformation of the said surfaces. Inelastic permanent deformation also occurs, and that is associated with wear and wear loss of material on the surfaces. These deformations change the shape and volume of the cavities, and an equivalent small volume of deformable, displaceable solid lubricant is pushed out from cavities into contact of bearing surface and countersurface. Also, despite lubrication, wear occurs at contact surface, and mechanics such as galling and micro-welding generate loose wear debris. If this debris remains on the contact surface, it acts as abrasive in the sliding contact of the contact surfaces. The cavities of bearing surface act as traps for the loose wear debris particles. The size of cavities is intentionally made larger than the typical largest size of the majority of wear debris particles. Once the debris particle moves into a cavity, it may displace an equal amount of the displaceable solid lubricant in the cavity, and thereafter the counterdrafts and the deformable solid lubricant remained in the cavity enhance the entrapment of the debris in the cavity. Each trapped debris particle displaces solid lubricant which then ends up to bearing surface.

In the embodiment of FIG. 1, the valve arrangement comprises two shafts; one above the closing member and one below the closing member. Alternatively, a valve arrangement may only comprise one shaft. In the embodiment of FIG. 5a, the layer of solid lubricant 17 is provided between the bearing surface and a block of material 18, which may be, for instance, a steel plate. Alternatively, said layer of solid lubricant may be provided between two bearing surfaces facing each other. In this alternative, the bearing surfaces are pressed towards each other and moved in a direction perpendicular to the pressing direction in order to enhance the extrusion of solid lubricant into said cavities.

Valves are also frequently used in operating conditions with increased temperatures, high operating pressures and corrosive fluids. The operating conditions therefore set requirements for the valve material selection. It is therefore advantageous to use materials that can be endure high stresses in an environment with increased temperature and acidic fluids, for instance.

It will be obvious to a person skilled in the art that, as the technology advances, the inventive concept can be implemented in various ways. The invention and its embodiments are not limited to the examples described above but may vary within the scope of the claims.

The invention claimed is:

1. A method of manufacturing a bearing surface for a valve, using additive manufacturing, comprising:
   providing a base,
   forming several layers on the base, the several layers comprising cavities, wherein a position of the cavities is changed between at least some of the several layers to form bearing surface cavities comprising counterdrafts and/or parameters of additive manufacturing are used that cause a rough or uneven surface to form the counterdrafts in the bearing surface cavities, and
   providing solid lubricant into the cavities.

2. The method of claim 1, wherein the layer are formed using metallic powder.

3. The method according to claim 2, wherein
   the solid lubricant is provided into the bearing surface cavities by providing a layer of solid lubricant against the bearing surface, and
   pressing the bearing surface towards the layer of solid lubricant to extrude the solid lubricant into the bearing surface cavities.

4. A valve comprising:
   a valve body with a main channel extending between a fluid inlet and a fluid outlet, and
   a closing member in the main channel, and
   a shaft connected to the closing member for moving the closing member between an open and a closed position, and
   at least one bearing surface between the valve body and the closing member or the valve body and the shaft, the bearing surface further comprising several layers comprising cavities, wherein
   a position of the cavities is changed between at least some of the several layers to form bearing surface cavities comprising counterdrafts, and/or sidewalls of the bearing surface cavities comprise counterdrafts formed by parameters of additive manufacturing that result in a rough or uneven surface, and
   a plurality of the bearing surface cavities are filled with solid lubricant.

5. The valve according to claim 4, wherein
   the bearing surface is an axial bearing surface bearing axial loads.

6. The valve according to claim 5, wherein
   the valve comprises a cylindrical sleeve or a ring with an end surface, and
   wherein the axial bearing surface is in the end surface.

7. The valve according to claim 6, wherein
   the cylindrical sleeve comprises a flange in the end surface.

8. The valve according to claim 4, wherein
   a second bearing surface is between the shaft and the valve body, and wherein
   the second bearing surface is a radial bearing surface bearing radial loads which comprises a plurality of cavities filled with solid lubricant.

9. The valve according to claim 4, wherein
the bearing surface is a radial bearing surface bearing radial loads.

10. The valve according to claim 9, wherein
the radial bearing surface is in at least an inner or outer circumferential surface of a cylindrical sleeve.

11. The valve according to claim 10, wherein
the cylindrical sleeve is between an outer cylindrical sleeve and an inner cylindrical sleeve.

12. The valve according to claim 4, wherein the counterdrafts promote holding of solid lubricant and/or entrapment of wear debris in the bearing surface cavities.

13. The valve according to claim 4, wherein
the solid lubricant is deformable and displaceable by wear debris particles.

* * * * *